United States Patent
Verbeke et al.

(10) Patent No.: US 11,392,201 B2
(45) Date of Patent: Jul. 19, 2022

(54) HAPTIC SYSTEM FOR DELIVERING AUDIO CONTENT TO A USER

(71) Applicant: HARMAN INTERNATIONAL INDUSTRIES, INCORPORATED, Stamford, CT (US)

(72) Inventors: Joseph Verbeke, Mountain View, CA (US); Adam Boulanger, Palo Alto, CA (US); Davide Di Censo, Sunnyvale, CA (US); Stefan Marti, Oakland, CA (US)

(73) Assignee: Harman International Industries, Incorporated, Stamford, CT (US)

( * ) Notice: Subject to any disclaimer, the term of this patent is extended or adjusted under 35 U.S.C. 154(b) by 256 days.

(21) Appl. No.: 16/319,333

(22) PCT Filed: Jul. 21, 2017

(86) PCT No.: PCT/US2017/043242
§ 371 (c)(1),
(2) Date: Jan. 19, 2019

(87) PCT Pub. No.: WO2018/017934
PCT Pub. Date: Jan. 25, 2018

(65) Prior Publication Data
US 2019/0268693 A1    Aug. 29, 2019

Related U.S. Application Data

(60) Provisional application No. 62/365,960, filed on Jul. 22, 2016.

(51) Int. Cl.
*G06F 3/01*      (2006.01)
*H04R 1/46*     (2006.01)
(Continued)

(52) U.S. Cl.
CPC .............. *G06F 3/016* (2013.01); *B60K 37/06* (2013.01); *B60Q 9/00* (2013.01); *B60W 50/16* (2013.01);
(Continued)

(58) Field of Classification Search
CPC ...... G06F 3/016; G06F 3/0488; G06F 3/0414; G06F 9/3004; G06F 2203/014;
(Continued)

(56) References Cited

U.S. PATENT DOCUMENTS 4,982,434 A * 1/1991 Lenhardt .............. H04R 25/606
                                                                     381/316
5,282,858 A * 2/1994 Bisch ........................ A61F 2/18
                                                                     381/162
(Continued)

FOREIGN PATENT DOCUMENTS

CN          1646833 A        7/2005
CN          1856763 A      11/2006
(Continued)

OTHER PUBLICATIONS

Non-Final Office Action for U.S. Appl. No. 16/319,331 dated Jan. 10, 2020, 18 pages.
(Continued)

*Primary Examiner* — Angelica M McKinney
(74) *Attorney, Agent, or Firm* — Artegis Law Group, LLP (57) ABSTRACT

One embodiment of the present disclosure sets forth a technique for delivering audio content to a user. The technique includes analyzing audio content to determine a frequency at which to vibrate an effector. The technique further includes configuring one or more haptic output devices to generate haptic output that generates a haptic trap proximate to the effector. The technique further includes configuring the one or more haptic output devices to modify
(Continued)

the haptic output to cause the haptic trap to vibrate the effector at the determined frequency. The effector vibrates to transmit the audio content. In one embodiment, the effector vibrates a skull of a user.

20 Claims, 6 Drawing Sheets

(51) Int. Cl.
  *B60Q 9/00* (2006.01)
  *B60W 50/16* (2020.01)
  *G06F 9/30* (2018.01)
  *B60K 37/06* (2006.01)
  *G06F 3/041* (2006.01)
  *G06F 3/0488* (2022.01)

(52) U.S. Cl.
  CPC .......... *G06F 3/0414* (2013.01); *G06F 3/0488* (2013.01); *G06F 9/3004* (2013.01); *H04R 1/46* (2013.01); *B60W 2552/00* (2020.02); *B60W 2554/00* (2020.02); *B60W 2555/20* (2020.02); *G06F 2203/014* (2013.01); *H04R 2460/13* (2013.01)

(58) Field of Classification Search
  CPC ..... B60Q 9/00; B60W 50/16; B60W 2552/00; B60W 2554/00; B60W 2555/20; H04R 1/46; H04R 2460/13; H04R 25/606; H04R 1/10; H04R 3/12; H04R 1/1075; H04R 1/105; H04R 25/48; H04R 25/75; H04R 25/353; B60K 37/06; A61N 1/36036
  See application file for complete search history.

(56) References Cited

U.S. PATENT DOCUMENTS

| | | | |
|---|---|---|---|
| 6,139,488 A * | 10/2000 | Ball | A61F 2/18 600/25 |
| 6,338,028 B1 | 1/2002 | Shelton et al. | |
| 6,377,693 B1 * | 4/2002 | Lippa | A61F 11/045 381/71.1 |
| 7,560,826 B2 | 7/2009 | Hijikata et al. | |
| 8,547,215 B2 | 10/2013 | Sanma et al. | |
| 8,845,110 B1 | 9/2014 | Worley, III | |
| 8,970,358 B2 | 3/2015 | Kiefer et al. | |
| 9,002,020 B1 * | 4/2015 | Kim | H04R 5/033 381/56 |
| 9,081,651 B2 | 7/2015 | Filev et al. | |
| 9,290,174 B1 | 3/2016 | Zagorski | |
| 9,317,119 B2 | 4/2016 | Hirose et al. | |
| 9,656,606 B1 | 5/2017 | Vose et al. | |
| 9,718,400 B2 | 8/2017 | Knobl et al. | |
| 9,827,811 B1 | 11/2017 | Mcnew et al. | |
| 9,827,904 B2 | 11/2017 | Modarres et al. | |
| 10,191,537 B2 | 1/2019 | Tanaka et al. | |
| 10,235,848 B2 | 3/2019 | Billington et al. | |
| 10,275,029 B2 | 4/2019 | Jones et al. | |
| 10,282,981 B1 | 5/2019 | Nepomuceno et al. | |
| 10,479,271 B2 | 11/2019 | Hashimoto et al. | |
| 2002/0122563 A1 | 9/2002 | Schumaier | |
| 2003/0168838 A1 | 9/2003 | Breed et al. | |
| 2004/0049323 A1 | 3/2004 | Tijerina et al. | |
| 2006/0284839 A1 | 12/2006 | Breed et al. | |
| 2007/0236450 A1 | 10/2007 | Colgate et al. | |
| 2008/0173092 A1 | 7/2008 | Hattori et al. | |
| 2008/0174451 A1 | 7/2008 | Harrington et al. | |
| 2009/0073112 A1 | 3/2009 | Basson et al. | |
| 2009/0076723 A1 | 3/2009 | Moloney | |
| 2009/0091215 A1 * | 4/2009 | Aoki | H01L 41/0973 310/369 |
| 2009/0219252 A1 | 9/2009 | Jarventie et al. | |
| 2009/0250267 A1 | 10/2009 | Heubel et al. | |
| 2009/0259372 A1 | 10/2009 | Hijikata et al. | |
| 2009/0284485 A1 | 11/2009 | Colgate et al. | |
| 2010/0013613 A1 | 1/2010 | Weston | |
| 2010/0085168 A1 | 4/2010 | Kyung et al. | |
| 2010/0198458 A1 | 8/2010 | Buttolo et al. | |
| 2011/0115709 A1 * | 5/2011 | Cruz-Hernandez | G06F 3/016 345/168 |
| 2011/0310028 A1 | 12/2011 | Camp, Jr. et al. | |
| 2011/0319703 A1 * | 12/2011 | Wiskerke | H04R 25/30 600/25 |
| 2012/0126965 A1 | 5/2012 | Sanma et al. | |
| 2012/0194483 A1 | 8/2012 | Deluca | |
| 2012/0245406 A1 * | 9/2012 | Aghamohammadi | A61F 11/04 600/25 |
| 2012/0306631 A1 | 12/2012 | Hughes | |
| 2013/0127755 A1 | 5/2013 | Lynn et al. | |
| 2013/0155020 A1 | 6/2013 | Heubel et al. | |
| 2013/0222311 A1 | 8/2013 | Pesonen | |
| 2014/0005682 A1 | 1/2014 | Worrell et al. | |
| 2014/0056461 A1 | 2/2014 | Afshar | |
| 2014/0306891 A1 | 10/2014 | Latta et al. | |
| 2014/0309880 A1 | 10/2014 | Ricci | |
| 2014/0310594 A1 | 10/2014 | Ricci et al. | |
| 2014/0320402 A1 | 10/2014 | Stahlberg | |
| 2014/0346823 A1 | 11/2014 | Stebbins et al. | |
| 2014/0350640 A1 * | 11/2014 | Patrick | A61N 1/0541 607/57 |
| 2014/0363033 A1 * | 12/2014 | Heiman | H04R 1/46 381/151 |
| 2015/0018660 A1 * | 1/2015 | Thomson | A61B 5/332 600/393 |
| 2015/0070148 A1 | 3/2015 | Cruz-Hernandez et al. | |
| 2015/0097657 A1 | 4/2015 | Gandhi et al. | |
| 2015/0175172 A1 | 6/2015 | Truong | |
| 2015/0197283 A1 | 7/2015 | Marti et al. | |
| 2015/0199950 A1 | 7/2015 | Heiman et al. | |
| 2015/0268722 A1 * | 9/2015 | Wang | A63F 13/837 345/156 |
| 2015/0268726 A1 | 9/2015 | Saboune et al. | |
| 2015/0293592 A1 | 10/2015 | Cheong | |
| 2015/0306312 A1 | 10/2015 | Palerm | |
| 2015/0307105 A1 | 10/2015 | Huber | |
| 2015/0314681 A1 | 11/2015 | Riley, Sr. et al. | |
| 2016/0004309 A1 | 1/2016 | Modarres et al. | |
| 2016/0107570 A1 | 4/2016 | Modarres et al. | |
| 2016/0179198 A1 | 6/2016 | Levesque et al. | |
| 2016/0187979 A1 | 6/2016 | Nahman et al. | |
| 2016/0187982 A1 * | 6/2016 | Ciesla | G06F 3/016 345/173 |
| 2016/0207454 A1 | 7/2016 | Cuddihy et al. | |
| 2016/0209944 A1 | 7/2016 | Shim et al. | |
| 2016/0217778 A1 | 7/2016 | Iermenko | |
| 2016/0259480 A1 * | 9/2016 | Augenbergs | G01L 3/22 |
| 2016/0357264 A1 | 12/2016 | Tissot | |
| 2017/0021762 A1 | 1/2017 | Daman | |
| 2017/0090576 A1 | 3/2017 | Peterson et al. | |
| 2017/0169673 A1 | 6/2017 | Billington et al. | |
| 2017/0249810 A1 | 8/2017 | Zerick et al. | |
| 2017/0262164 A1 | 9/2017 | Jain et al. | |
| 2017/0336903 A1 * | 11/2017 | Rivaud | B60K 35/00 |
| 2018/0335847 A1 | 11/2018 | Levesque et al. | |
| 2019/0047591 A1 | 2/2019 | Augst | |
| 2019/0122525 A1 | 4/2019 | Lancelle | |

FOREIGN PATENT DOCUMENTS

| | | |
|---|---|---|
| CN | 101180584 A | 5/2008 |
| CN | 101424975 A | 5/2009 |
| CN | 101507290 A | 8/2009 |
| CN | 103568949 A | 2/2014 |
| CN | 104756173 A | 7/2015 |
| CN | 104816727 A | 8/2015 |
| EP | 1 956 466 A1 | 8/2008 |
| FR | 3022726 A1 | 12/2015 |
| JP | H08-166450 A | 6/1996 |
| JP | 2004-158961 A | 6/2004 |

(56) References Cited

FOREIGN PATENT DOCUMENTS

| | | | |
|---|---|---|---|
| JP | 2004158961 A * | 6/2004 | |
| JP | 2005-040376 A | 2/2005 | |
| JP | 2005-047327 A | 2/2005 | |
| JP | 2005-080227 A | 3/2005 | |
| JP | 2006-199094 A | 8/2006 | |
| JP | 2007-065798 A | 3/2007 | |
| JP | 2008-039497 A | 2/2008 | |
| JP | 2008-171383 A | 7/2008 | |
| JP | 2010-066640 A | 3/2010 | |
| JP | 2010-118877 A | 5/2010 | |
| JP | 2010-518500 A | 5/2010 | |
| JP | 2012-048378 A | 3/2012 | |
| JP | 2012-155526 A | 8/2012 | |
| JP | 2013-053867 A | 3/2013 | |
| JP | 2015-502888 A | 1/2015 | |
| JP | 2015-079289 A | 4/2015 | |
| JP | 2015-130187 A | 7/2015 | |
| JP | 2015-186072 A | 10/2015 | |
| JP | 2016-078602 A | 5/2016 | |
| KR | 10-2010-0114605 A | 10/2010 | |
| WO | 2010/105006 A1 | 9/2010 | |
| WO | 2010/105011 A1 | 9/2010 | |
| WO | 2015/054789 A1 | 4/2015 | |
| WO | 2015/086919 A2 | 6/2015 | |

OTHER PUBLICATIONS

Non-Final Rejection received for U.S. Appl. No. 16/319,330, dated Mar. 4, 2020, 50 pages.
Extended European Search Report for application No. 17831480.3 dated Nov. 21, 2019, 7 pages.
International Search Report for application No. PCT/US2017/037619 dated Sep. 27, 2017, 7 pages.
Non-Final Rejection received for U.S. Appl. No. 16/319,316, dated Aug. 14, 2019, 20 pages.
Notice of Allowance received for U.S. Appl. No. 16/319,316, dated Dec. 13, 2019, 14 pages.
Extended European Search Report for application No. 17831478.7 dated Nov. 21, 2019, 7 pages.
International Search Report for application No. PCT/US2017/037593 dated Sep. 7, 2017, 7 pages.
Non-Final Rejection received for U.S. Appl. No. 16/319,331, dated Jan. 10, 2020, 24 pages.
Extended European Search Report for application No. 17831936.4 dated Nov. 22, 2019, 7 pages.
International Search Report for application No. PCT/US2017/043238 dated Oct. 2, 2017, 7 pages.
Non-Final Rejection received for U.S. Appl. No. 16/319,319, dated Dec. 27, 2019, 26 pages.
Extended European Search Report for application No. 17831937.2 dated Nov. 26, 2019, 8 pages.
International Search Report for application No. PCT/US2017/043240 dated Sep. 29, 2017, 9 pages.
Extended European Search Report for application No. 17831989.3 dated Nov. 29, 2019, 8 pages.
International Search Report for application No. PCT/US2017/043374 dated Oct. 6, 2017, 14 pages.
Non-Final Rejection received for U.S. Appl. No. 16/319,332, dated Nov. 27, 2019, 28 pages.
Extended European Search Report for application No. 17831938.0 dated Dec. 6, 2019, 7 pages.
International Search Report for application No. PCT/US2017/043242 dated Sep. 29, 2017, 9 pages.
Final Office Action for U.S. Appl. No. 16/319,331, dated Jun. 15, 2020, 15 pages.
Final Office Action for U.S. Appl. No. 16/319,332, dated Jun. 15, 2020, 16 pages.
Non-Final Office Action received for U.S. Appl. No. 16/319,332, dated Aug. 18, 2020, 19 pages.
Yoshino et al., "Tactile Feedback in 2.5 Dimensional Touch Screen", The Proceedings of JSME annual Conference on Robotics and Mechatronics, The Japan Society of Mechanical Engineers , May 24, 2014, pp. 3P2-E07(1)-3P2-E07(3).
Sun et al., "Circular bimorph piezoelectric bone2conduction hearing device", Journal of Jilin University (Engineering and Technology Edition), vol. 40, No. 1, Jan. 2010, 5 pages.
Jiang et al., "Study on Piezoelectric Bone Conduction Hearing Equipment with Rectangle Structure", Machinery Design & Manufacture, Aug. 2012, 3 pages.

* cited by examiner

HAPTIC SYSTEM FOR DELIVERING AUDIO CONTENT TO A USER

CROSS-REFERENCE TO RELATED APPLICATIONS

The present application is a national stage application of the international application titled, "HAPTIC SYSTEM FOR DELIVERING AUDIO CONTENT TO A USER," filed on Jul. 21, 2017 and having application number PCT/US2017/043242, which claims priority benefit of the United States Provisional Patent Application titled, "VEHICLE INTERFACE SYSTEMS," filed on Jul. 22, 2016 and having Ser. No. 62/365,960. The subject matter of these related applications is hereby incorporated herein by reference.

BACKGROUND

Field of the Embodiments

The various embodiments relate generally to human-machine interfaces and, more specifically, to a haptic system for delivering audio content to a user.

Description of the Related Art

Audio is a major part of consumer electronics. Audio devices translate signals from electronic devices into audible mechanical waves that a user may hear. For example, a user may attach headphones or speakers to a laptop computer in order to hear sounds associated with applications on the laptop. In addition, users may hear audio from in-vehicle infotainment systems via speakers located within the car.

Conventionally, headphones are placed over ears of a user, which may deliver sounds directly to the user. Such devices may deliver audio content in a private manner that may allow a user to listen to audio content without concern that other individuals in the environment may hear the audio content. In addition, speakers also deliver audio content to users via audible mechanical waves. Speakers broadcast audio content into a large area, which one or more users may hear.

One drawback of conventional approaches is that headphones may reduce a user's ability to hear sounds from the environment. In particular, headphones may absorb and/or reflect sound waves in the user's environment, thereby obstructing the sound waves from reaching eardrums of the user. Another drawback of conventional approaches is that generally speakers deliver audio content to a large area such that a user near the speakers may hear the audio content. Therefore, a user may be unable to listen to audio content privately when other individuals are nearby the speakers.

Conventional bone conduction headphones may deliver audio content to a user privately, without affecting the user's ability to hear sound waves from the environment. Generally, conventional bone conduction headphones vibrate bones in a skull of a user in order to cause a cochlea of the user to resonate, which may deliver audio content to the user in a private manner. Eardrums of a user are not affected by the conventional bone conduction headphones, and so the user may hear sound waves from the environment while listening to audio content from conventional bone conduction headphones.

However, conventional bone conduction headphones are often large in size. Large headphones may be cumbersome and uncomfortable for a user to wear for long periods of time. In addition, conventional bone conduction headphones require a power source, such as batteries. Batteries add to the bill of materials of the system, require replacement, need to be recharged after a given period of time, and/or add to the weight of the headphones.

As the foregoing illustrates, techniques for more effectively delivering private audio communications to a user would be useful.

SUMMARY

Embodiments of the present disclosure set forth a method for delivering audio content to a user. The method includes analyzing audio content to determine a frequency at which to vibrate an effector. The method further includes configuring one or more haptic output devices to generate haptic output that generates a haptic trap proximate to the effector. The method further includes configuring the one or more haptic output devices to modify the haptic output to cause the haptic trap to vibrate the effector at the determined frequency. The effector vibrates to transmit the audio content.

Further embodiments provide, among other things, a system and a non-transitory computer-readable storage medium configured to implement the techniques set forth above.

At least one advantage of the techniques described herein is that audio content can be transmitted to a user by a mid-air haptic system. Using haptic output devices to transmit audio content to a user via bone conduction enables private delivery of audio content to a user, without reducing the user's ability to hear sounds in the external environment. Accordingly, the techniques described herein can be implemented to design mid-air haptic systems for audio content delivery in environments that place a high auditory demand on users, such as public transportation hubs.

BRIEF DESCRIPTION OF THE SEVERAL VIEWS OF THE DRAWINGS

So that the manner in which the recited features of the one or more embodiments set forth above can be understood in detail, a more particular description of the one or more embodiments, briefly summarized above, may be had by reference to certain specific embodiments, some of which are illustrated in the appended drawings. It is to be noted, however, that the appended drawings illustrate only typical embodiments and are therefore not to be considered limiting of its scope in any manner, for the scope of the various embodiments subsumes other embodiments as well.

DETAILED DESCRIPTION

Figure 1:
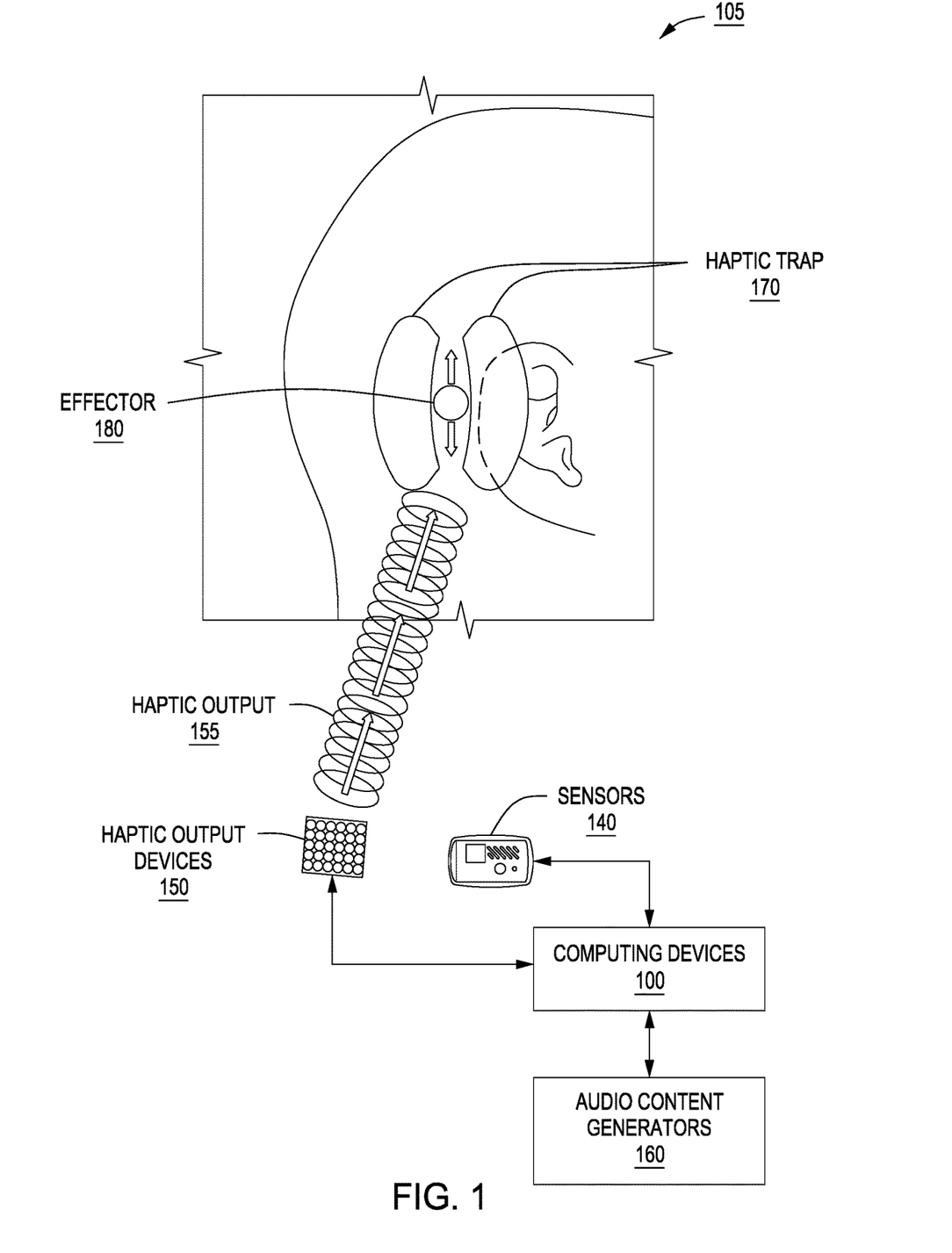
FIG. 1 illustrates a system configuration for implementing various embodiments of the present disclosure.

FIG. 1 illustrates a system configuration for implementing various embodiments of the present disclosure. As shown, system environment 105 includes computing device 100, audio content generator 160, and sensors 140. In addition, system environment 105 includes haptic output devices 150 that generate haptic output 155. Haptic output 155 generates haptic trap 170 proximate to effector 180.

Effector 180 is any type of object that is capable of vibrating a surface coupled to the effector 180 when a vibrational force is applied to effector 180. Effector 180 may be constructed out of a variety of materials including plastics, metals, alloys, and so forth. In various embodiments, effector 180 is a rigid spherical object. In other embodiments, effector 180 may be a rigid object that has one of a variety of shapes including polyhedral shapes, cones, freeform shapes, and so forth. In addition, effector 180 may be constructed to a variety of sizes and weights. For example, effector 180 could be a spherical object with a 1-centimeter radius.

In one embodiment, effector 180 is located proximate to a user. In particular, the body of the user may include a skull. In such embodiments, effector 180 may be located proximate to the skull of the user. For example, effector 180 could be grafted into or mounted onto a bone in the skull of the user, could be attached to a plate that is grafted into or mounted onto the skull of the user, and/or can be included in a piece of body jewelry that is in contact with a bone in the skull of the user. In particular, effector 180 may be attached to a temporal bone in the skull of the user (e.g., a squamosal suture). Additionally or alternatively, effector 180 may be located on a piece of body jewelry that is attached to an ear of the user, an eyebrow of the user, a nose of the user, and so forth. In such embodiments, the piece of jewelry is in contact with a bone in the skull of the user. Furthermore, in some embodiments, a body of a user may include a head. Effector 180 may be temporarily placed proximate to the head of the user. In such embodiments, effector 180 may be located within an effector enclosure and the effector enclosure may be placed proximate on the head of the user. In further embodiments, effector 180 is located proximate to a diaphragm in a speaker. Moreover, in other embodiments, effector 180 is located proximate to a piezoelectric material in a piezoelectric film.

In operation, effector 180 mechanically transfers vibrational forces to a surface. In particular, a user may have a skull. Effector 180 may be located proximate to the skull of the user. In one embodiment, effector 180 is in contact with the skull of the user. Applying a force to effector 180 displaces effector 180. The displacement of effector 180 generates a force in the direction of the displacement on the skull of the user. Thus, applying a vibrational force to effector 180 causes effector 180 to apply a vibrational force on the skull of the user. Forces applied on the skull of the user may be mechanically transferred to a cochlea of the user, and thus may cause the cochlea to vibrate. When the cochlea vibrates, one or more action potentials may travel along an auditory nerve of the user and may be registered by the user as audio sounds. Various parameters of the vibration of effector 180 (e.g., the frequency, amplitude, and phase) may determine the characteristics of the action potentials transmitted along the auditory nerve (e.g., the number, shape, and amplitude of the action potentials). The characteristics of the action potentials transmitted along the auditory nerve may determine the specifics of the audio sounds that the user hears.

Effector 180 may include various electronic components for providing location information associated with the effector 180 (also referred to herein as "localization data"). For example, effector 180 could include radio frequency identification (RFID) chips, Bluetooth® low energy transmitters, infrared (IR) emitters, capacitive sensing components, and other types of small localization components.

Sensors 140 include any type of sensor that can generate localization data associated with the location of effector 180. Sensors 140 may include various types of imaging sensors, including visual sensors (e.g., RGB image sensors), patterned and pattern-less IR imagers, time-of-flight sensors (e.g., depth cameras), thermal sensors, radar based sensors (e.g., short range and long range sensors), laser based sensors (e.g., LIDAR), ultrasound based sensors, microwave based sensors, driver facing cameras, capacitive sensors and transmitters, Bluetooth® sensors (e.g., Bluetooth® low energy sensors), ultrasound based sensors for triangulation and location, and so forth.

In various embodiments, sensors 140 are collocated with effector 180. In other embodiments, sensors 140 are located in an external platform positioned around the user, such as on a vehicle console. In a third embodiment, sensors 140 are included in a mobile or wearable device, such as a mobile phone, smart watch, or other device on the user. Sensors 140 transmit the localization data to computing device 100. Sensors 140 may transmit the localization data via a controller area network, a local interconnect network, a FlexRay®, and so forth.

In one embodiment, haptic output devices 150 include ultrasonic transducers. Ultrasonic transducers generate haptic output 155 in the form of ultrasonic waves. In various embodiments, haptic output devices 150 receive one or more control signals from computing device 100 that indicate how one or more parameters of haptic output devices 150 should be configured. These parameters include the intensity, frequency, and phase of haptic output 155 generated by each of haptic output devices 150. Based on the parameter values specified by the control signal(s), haptic output devices 150 generate haptic output 155.

In particular, haptic output 155 generated by two or more haptic output devices 150 may occupy a particular location in space at a particular time, enabling haptic output 155 of one of haptic output devices 150 to interfere constructively and/or destructively with haptic output 155 of one or more other haptic output devices 150. Constructive interference between haptic output 155 generated by different haptic output devices 150 may produce haptic output maxima at the locations at which haptic output 155 constructively interferes. A haptic output maximum is a location at which the intensity of haptic output 155 is large relative to at least one other location that also receives haptic output 155. Destructive interference between haptic output 155 generated by different haptic output devices 150 may produce haptic output minima at the locations at which haptic output 155 destructively interferes. A haptic output minimum is a location at which the intensity of haptic output 155 is small relative to at least one other location that also receives haptic output 155.

The haptic output maxima and haptic output minima are herein referred to collectively as haptic output extrema. The parameters of the haptic output extrema include an intensity profile and a position. The intensity profile indicates the intensity of the haptic output 155 at various positions in and around the haptic output extrema. Haptic output 155 produces haptic trap 170. The parameters of the haptic output extrema determine the characteristics of haptic trap 170, which include a size, shape, intensity spectrum, and location. For example, as shown in system environment 105, haptic trap 170 includes one or more haptic output minima located between two rows of haptic output maxima. The shape of haptic trap 170 is determined by the positions of haptic output extrema. In system environment 105, the positions of the haptic output maxima define the center of each section of haptic trap 170. The positions of the haptic output minima define the center of haptic trap 170. Furthermore, the intensity profiles and positions of the haptic output extrema determine the size and location of haptic trap 170. Additionally or alternatively, in some embodiments, haptic trap 170 may include haptic output minima that are fully or partially encircled by haptic output maxima. Each configuration of haptic output extrema corresponds to haptic trap 170 with a different size, shape, intensity spectrum, and location.

In various embodiments, one or more parameters of the haptic output extrema may be adjusted by configuring haptic output devices 150 to modify one or more parameters of haptic output 155 that produces haptic trap 170. In particular, the positions of each of the haptic output extrema may be shifted, and the intensity profiles of each of the haptic output extrema may be modified. As disclosed above, varying the parameters of the haptic output extrema modifies one or more parameters of haptic trap 170. In this manner, the control signal(s) configure haptic output devices 150 to modify various parameters of haptic trap 170.

For example, the intensity, phase and/or frequency of haptic output 155 generated by each of haptic output devices 150 could be modified in order to shift the positions of haptic output extrema upwards. In addition, the number of haptic output maxima and haptic output minima can be increased and/or decreased and/or the intensity profile of the haptic output extrema can be modified. As a result, various characteristics of haptic trap 170 could be adjusted, including the size, shape, location, and intensity spectrum of haptic trap 170.

In various embodiments, effector 180 is located at a haptic output minimum in haptic trap 170. Again, haptic output minimum is a location at which the intensity of haptic output 155 is small relative to at least one other location that also receives haptic output 155. Shifting the position of that haptic output minimum applies a restoring force on effector 180 in a direction that points towards the new location of the haptic output minimum. The restoring force is caused by the increased intensity of haptic output present outside of a haptic output minimum. When the position of the haptic output minimum shifts, a section of effector 180 no longer lies at the center of the haptic output minimum. The section of effector 180 that lies outside of the new position of the haptic output minimum experiences an increased intensity of haptic output. The increased intensity of haptic output 155 exerts a restoring force on effector 180 in the direction that the haptic output minimum shifted. Thus, the restoring force pushes effector 180 back towards the center of the haptic output minimum. In this manner, shifting the position of the haptic output extrema shifts the position of effector 180.

Furthermore, shifting the position of the haptic output minimum between a first position and a second position can generate a vibrational force on effector 180. The vibrational force can cause effector 180 to vibrate with a particular amplitude and frequency. In particular, the distance between the first position of the haptic output minimum and the second position of the haptic output minimum determines the amplitude of the vibration of effector 180. The number of cycles that effector 180 completes between the first position and the second position per unit time determines the frequency of the vibration of effector 180.

In some embodiments, such as the one shown in system environment 105, effector 180 is located on the user's head. When haptic trap 170 exerts the vibrational force on effector 180, the effector vibrates, thereby vibrating the user's skull. The skull vibrates at a frequency and amplitude may match the frequency and amplitude of the audio content generated by the audio content generators 160. The vibration of the skull may be mechanically transferred to the user's cochlea, which may vibrate the user's cochlea at the specified frequency and amplitude. When the cochlea vibrates, the cochlea may produce action potentials that may travel along the user's auditory nerves. The amplitude, shape, and time separation between the cochlea generating each action potential may be determined by the frequency and amplitude of vibration of the cochlea. Thus, the action potentials may be reflective of the frequency and amplitude of the audio content generated by the audio content generators 160. Furthermore, the action potentials may be registered by the user as audio sound. In particular, the amplitude and shape of the action potentials and the time separation between individual action potentials may deliver the audio content generated by the audio content generators 160 to the user.

As shown in system environment 105, haptic output devices 150 are arranged in an array, however, other arrangements of haptic output devices 150 are within the inventive concept. For example, haptic output devices 150 can be arranged in a linear manner, in a circular or elliptical manner, or may be randomly placed at various distances from and locations about effector 180. As shown, haptic output devices 150 are arranged below effector 180, however, haptic output devices 150 can be located at any position around effector 180. For example, haptic output devices 150 could be located above effector 180 and at various angles and distances to effector 180. Regardless of the arrangement and locations of haptic output devices 150, haptic output 155 generated from haptic output devices 150 may produce haptic trap 170 with various shapes and sizes. For example, haptic output devices 150 arranged in a 5×5 array may generate haptic output 155 that produces haptic trap 170 with a circular or elliptical and with various diameters, positions, and intensity spectra. Furthermore, the 5×5 array of haptic transducer devices 150 may further modify haptic output 155 to produces haptic trap 170 that generates a vibrational force on effector 180 with a specific amplitude and frequency.

Audio content generators 160 include any type of device capable of generating audio content. Audio content may include a single frequency audio tone or more complex audio content. Audio content generators 160 may be included in an in-vehicle infotainment system, a driver assistance system, and so forth. Audio content generators 160 may also include audio content from a cloud streaming service, audio content produced by a mobile and/or wearable device, audio content from an in-vehicle infotainment system, audio content stored in computing device 100, audio content received via a microphone system, and so forth.

Computing device 100 may be a microprocessor, an application-specific integrated circuit (ASIC), a system-on-a-chip (SoC), and so forth. As shown, computing device 100 may be independent of audio content generators 160. In alternative embodiments, computing device 100 may be embedded in audio content generators 160 and/or may share one or more processing units, input/output (I/O) interfaces, and/or memory devices (e.g., a database) with audio content generators 160. As noted above, in various embodiments, computing device 100 receives localization data from sensors 140 and audio content from audio content generators 160. Furthermore, computing device 100 transmits control signals to haptic output device 150 that configure haptic output devices 150 to generate a particular type of haptic output 155 that produces haptic trap 170 proximate to effector 180.

Figure 2:
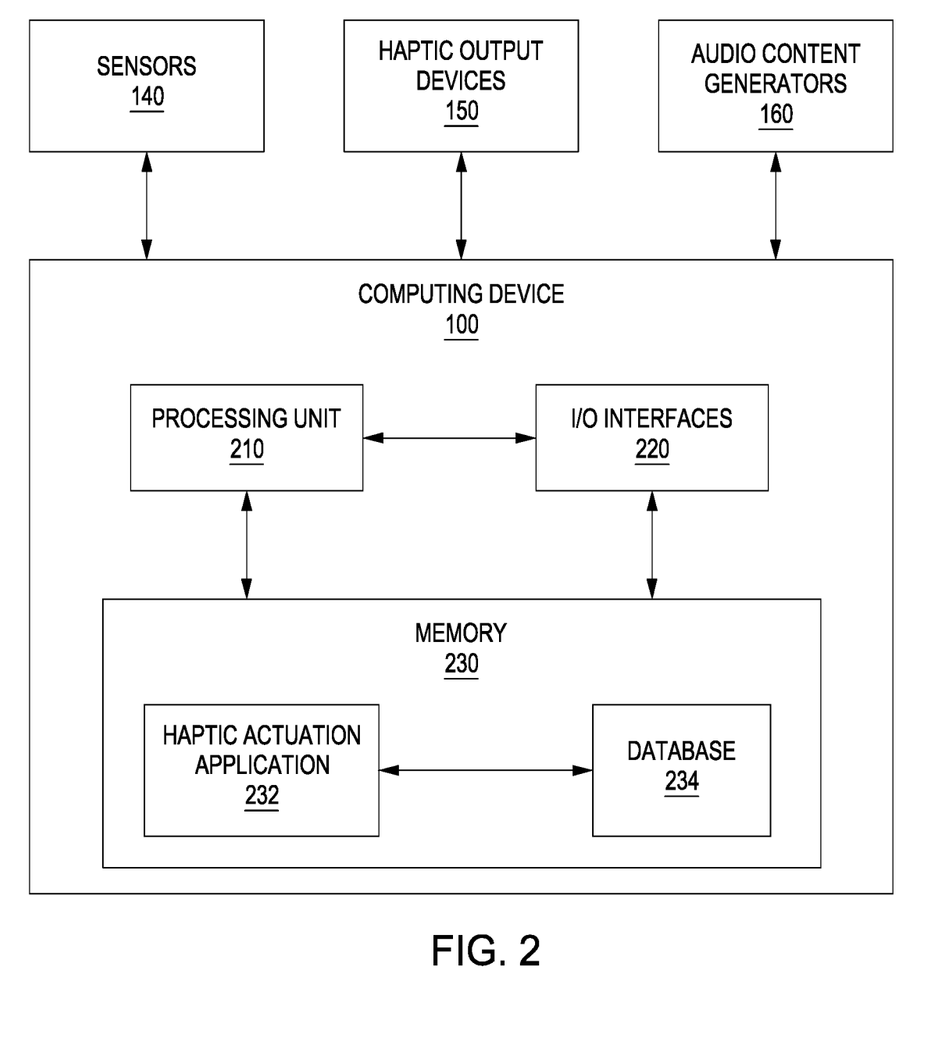
FIG. 2 illustrates a block diagram of a computing device configured to implement one or more aspects of the present disclosure, according to various embodiments.

FIG. 2 illustrates a block diagram of computing device 100 configured to implement one or more aspects of the present disclosure, according to various embodiments. As shown, computing device 100 includes processing unit 210, I/O interfaces 220, and memory 230. Memory 230 further includes haptic actuation application 232 and database 234.

Input/output (I/O) interfaces 220 may include one or more interfaces that coordinate the transfer of data between computing device 100 and sensors 140, haptic output devices 150, audio content generators 160, and other systems that transmit or receive data from computing device 100. In various embodiments, I/O interfaces 220 coordinate the transfer of audio content between audio content generators 160 and computing device 100. In addition, I/O interfaces 220 coordinate the transfer of localization data between sensors 140 and computing device 100. Furthermore, I/O interfaces 220 coordinate the transfer of control signals between computing device 100 and haptic output device 150. I/O interfaces 220 may transmit and/or receive various types of data via a controller area network, a local interconnect network, a FlexRay®, and so forth. In addition, I/O interfaces 220 may receive electrical signals from one or more microphones external to computing device 100 that detect audio waves in the environment.

Processing unit 210 may include a central processing unit (CPU), digital signal processing unit (DSP), a sensor processing unit, a controller unit, and so forth. Processing unit 210 may be physically embedded into computing device 100, may be part of a cloud-based computing environment, and/or may be physically introduced into computing device 100 by a user, such as in a mobile or wearable device. In some embodiments, processing unit 210 may be an element of control units 160, such as a microprocessor within an in-vehicle infotainment system or a driver assistance system. In various embodiments, processing unit 210 is configured to execute applications included in memory 230.

Memory 230 includes haptic actuation application 232 configured to transmit data to and receive data from database 234. Processing unit 210 executes haptic actuation application 232 to implement the overall functionality of computing device 100. Memory 230 may be embedded in control units 160 or introduced into computing device 100 by a user. Moreover, memory 230 may be included in a cloud-based computing environment.

Database 234 may store various types of data including, user preferences data (e.g., a preferred range of amplitudes and frequencies at which to vibrate effector 180), various pre-set configurations for one or more of sensors 140 and haptic output devices 150, configurations set by the user, and so forth. For example, database 234 could store the type, position, orientation, frequency range, and intensity range of haptic output devices 150. Database 234 may also store look-up tables, algorithms, etc. for analyzing localization data in order to identify the position of effector 180. Furthermore, database 234 may store instructions for determining a type of haptic trap 170 to generate proximate to effector 180 and may store one or more characteristics of effector 180, including the size, weight, and shape of effector 180.

Haptic actuation application 232 receives audio content from audio content generators 160 and analyses the audio content to determine frequency and amplitude patterns in the audio content. Furthermore, for audio content with multiple simultaneous frequency patterns, haptic actuation application 232 determines phase relationships between pairs of frequency patterns. When the frequency patterns are delivered to the user, haptic actuation application 232 preserves the phase relationships between pairs of frequency patterns in order to produce a high-integrity reproduction of the audio content generated by audio content generators 160. In some embodiments, haptic actuation application 232 may receive electrical signals via I/O devices 120 from one or more microphones that detect audio waves in the environment. In such embodiments, haptic actuation application 132 analyses the electrical signals to determine frequency and amplitude patterns and phase relationships between frequency patterns, as described above.

In operation, haptic actuation application 232 configures haptic output devices 150 to generate haptic output 155 that creates haptic trap 170. Haptic actuation application 232 further configures haptic output devices 150 to modify haptic output 155 to cause haptic trap 170 to vibrate effector 180 at a particular frequency and amplitude. Haptic actuation application 232 selects the frequency and amplitude of the vibration force to match the frequency and amplitude of the audio content generated by audio content generators 160. Vibrating effector 180 at the selected frequency and amplitude causes effector 180 to vibrate any surface proximate to effector 180 at that particular frequency and amplitude. In various embodiments, haptic actuation application 232 selects the frequency and amplitude of vibration of effector 180 to be slightly higher than the frequency and amplitude of the audio content generated by audio content generators 160. Thus, dissipative forces acting on effector 180 and the surface cause the surface to vibrate at a substantially similar frequency and amplitude to the frequency and amplitude of the audio content generated by the audio content generators 160.

In various embodiments, haptic actuation application 232 analyzes localization data from sensors 140 to determine the position of effector 180. Haptic actuation application 232 may access data from database 234 to determine one or more characteristics of effector 180, including the size, weight, and shape of effector 180. Haptic actuation application 232 may determine various parameters of haptic trap 170 based on the characteristics of effector 180.

In addition, haptic actuation application 232 also accesses data from database 234 that indicates the position and orientation of haptic output devices 150. Based on the position and orientation of haptic output devices 150 relative to the position of effector 180, haptic actuation application 232 determines a directionality of haptic output 155 and a location at which to generate haptic trap 170 relative to effector 180. In one embodiment, effector 180 is located at a haptic output minimum of haptic trap 170. Based on the directionality, haptic actuation application 232 determines an amplitude, frequency, and phase with which each haptic output device in the haptic output devices 150 should generate haptic output 155 in order to generate haptic trap 170 at the determined location.

Haptic actuation application 232 determines characteristics of haptic trap 170, including the size, shape, and intensity spectrum of haptic trap 170. The intensity spectrum of haptic trap 170 includes the amplitude and gradient of the haptic output intensity at each position in haptic trap 170. Haptic actuation application 232 may analyze audio content from audio content generators 160 as well as user preferences data in database 234 to determine an amplitude range and a frequency range within which to vibrate effector 180. Based on the characteristics of effector 180 and the determined amplitude and frequency ranges, haptic actuation application 232 may determine a size, shape, and intensity spectrum of haptic trap 170. For example, haptic trap 170 could be larger for vibrations with a large amplitude and smaller for vibrations with a smaller vibration. In addition, the intensity spectrum of haptic trap 170 could be larger for vibrations of a high frequency and smaller for vibrations of a low frequency. Furthermore, the shape of haptic trap 170 is determined by the location and intensity profiles of the haptic output extrema. Thus, haptic trap 170 defined by a haptic output minimum encircled by haptic output maxima may have a circular or elliptical shape. Haptic trap 170 defined by haptic output maxima located are two opposite sides of a haptic output minimum may have the shape of a lemniscate. Haptic trap 170 defined by haptic output maxima located at more than two sides of a haptic output minimum may have the rose-petal shape.

Furthermore, haptic actuation application 232 may determine an intensity profile for various haptic output extrema. In particular, haptic actuation application 232 determines the intensity profile of the haptic output minimum in which effector 180 is located. The intensity profile of the haptic output minimum determines the magnitude of the restoring force applied to effector 180. As stated above, when the position of the haptic output minimum shifts, a restoring force is applied to effector 180. The magnitude of the restoring force applied to effector 180 is related to the intensity profile of the haptic output minimum. Haptic actuation application 232 determines the intensity profile of the haptic output minimum based on the size, weight and shape of effector 180 and the frequency and amplitude of the audio content being transmitted to the user.

Haptic actuation application 232 can increase the gradient of the intensity profile in order to exert a restoring force that sharply increases in magnitude as the position of the effector 180 moves away from the haptic output minimum. Such an intensity profile may decrease the phase lag between the movement of the haptic output minimum and the movement of effector 180. Such an intensity profile may also be implemented with larger effectors 180 and/or with power constrained haptic output devices 150. Haptic actuation application 232 may increase the gradient of the intensity profile by reducing the distance between the haptic output minimum and haptic output maxima located proximate to the haptic output minimum. Additionally or alternatively, haptic actuation application 232 may configure haptic output devices 150 to generate haptic output 155 that increases the intensity difference between the haptic output maxima and the haptic output minimum.

Haptic actuation application 232 can decrease the gradient of the intensity profile in order to exert a restoring force that slowly increases in magnitude as the position of the haptic output minimum shifts. Such an intensity profile may also be implemented with smaller effectors 180 and/or with power constrained haptic output devices 150. Haptic actuation application 232 may decrease the gradient of the intensity profile by increasing the distance between the haptic output minimum and haptic output maxima located proximate to the haptic output minimum. Additionally or alternatively, haptic actuation application 232 may configure haptic output devices 150 to generate haptic output 155 that decreases the intensity difference between the haptic output maxima and the haptic output minimum.

In some embodiments, haptic actuation application 232 may access database 234 to determine the allowable range of frequencies and amplitudes of audio content being transmitted to a user. In particular, if the maximum frequency and/or amplitude is above the allowable frequency and/or amplitude range, haptic actuation application 232 may decrease the average frequency and/or amplitude of the audio content to bring the highest frequency and/or amplitude present in the audio content into the range of allowable frequencies and amplitudes. In addition, if the minimum frequency and/or amplitude is below the allowable frequency and/or amplitude range, haptic actuation application 232 may increase the average frequency and/or amplitude to bring the lowest frequency and/or amplitude of the audio content into the range of allowable frequencies and amplitudes.

Haptic actuation application 232 generates control signals that configure haptic output devices 150 to generate haptic output 155 that produces haptic trap 170 at the determined position proximate to effector 180. In addition, haptic actuation application 232 generates control signals that configure haptic output devices 150 to modify haptic output 155 in a manner that adjusts one or more parameters of haptic output extrema in haptic trap 170. In such a manner, haptic actuation application 232 can change various parameters of haptic trap 170. For example, haptic actuation application 232 could cause the location of the haptic output extrema located in haptic trap 170 to shift upwards, thereby exerting a restoring force on effector 180 that pushes effector 180 upwards. Specifically, haptic actuation application 232 configures the haptic output devices 150 to generate haptic output 155 that shifts the position of the haptic output minimum proximate to effector 180 upwards, thereby exerting a restoring force on effector 180. The restoring force shifts the position of effector 180 upwards.

Haptic actuation application 232 further configures haptic output devices 150 to generate haptic output 155 that repeatedly shifts the position of the haptic output minimum proximate to effector 180. In one embodiment, haptic actuation application 232 configures haptic output devices 150 to generate haptic output 155 that shifts the position of the haptic output minimum between a first position and a second position. Such a sequence of movements exerts a sequence of restoring forces on effector 180 that repeatedly switch between pushing effector 180 from the first position towards the second position and then pushing effector 180 from the second position towards the first position. Such a sequence of restoring forces is herein defined as a vibrational force. Haptic actuation application 232 configures haptic output devices 150 to generate haptic output 155 that varies the position of various haptic output extrema included in haptic trap 170, including the haptic output minimum proximate to effector 180, in order to exert a vibrational force on effector 180. Haptic actuation application 232 further configures haptic output devices 150 to modify haptic output 155 in a manner that causes haptic trap 170 to exert a vibrational force on effector 180 with a specific frequency and amplitude.

Figure 3:
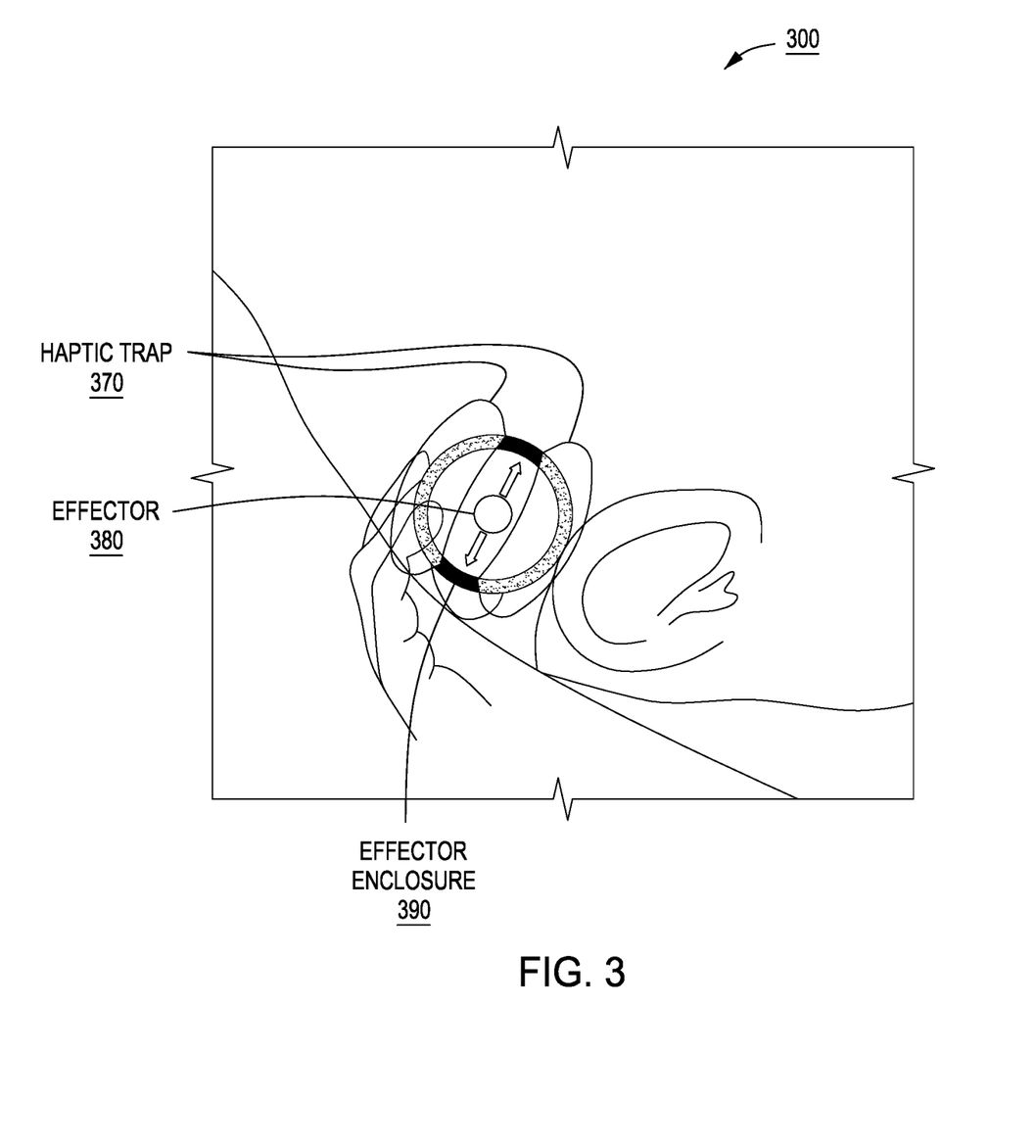
FIG. 3 illustrates a system configuration for temporarily placing an effector near a user's body part in order to transmit audio content generated by audio content generators to the user, according to various embodiments.

FIG. 3 illustrates a system configuration for temporarily placing effector 180 near a body part of a user in order to transmit audio content generated by audio content generators 160 to the user, according to various embodiments. As shown, system environment 300 includes effector 380, effector enclosure 390, and haptic trap 370.

Effector 380 is located within effector enclosure 390. Effector enclosure 390 is any type of hollow object that allows haptic output 155 to travel into and out of the object, is large enough to allow effector 380 to move within effector enclosure 390, and is capable of vibrating a surface when vibrated. As describe above, haptic actuation application 232 configures haptic output devices 150 to generate haptic output 155 that generates haptic trap 370 proximate to effector 380.

As further described above, haptic actuation application 232 configures haptic output devices 150 to modify haptic output 155 in order to exert a correction force on effector 380. Exerting a correction force on effector 380 may cause effector 380 to strike the inner surface of effector enclosure 390, thereby exerting a force on effector enclosure 390. Exerting a force on effector enclosure 390 causes effector enclosure 390 to displace in the direction in which effector 380 applied the force.

When effector enclosure 390 is located proximate to a user's head, the displacement of effector enclosure 390 applies a force to a skull of the user in the direction in which effector enclosure 390 displaced. The direction and amplitude of the correction force exerted on effector 380 causes effector 380 to strike various sections of the inside surface of effector enclosure 390 in a particular order and with a particular amount of force. For example, when haptic trap 370 exerts a correction force on effector 380 in an upwards direction, effector 380 could strike an upper section of the inside surface of haptic trap 370. Effector 380 could exert a force on effector enclosure 390 in an upwards direction that causes effector enclosure 390 to move upwards. When effector enclosure 390 is in contact with the user's head, a displacement of effector enclosure 390 in an upward direction exerts a force on the user's head in an upwards direction.

In some embodiments, haptic actuation application 232 configures haptic output devices 150 to modify haptic trap 370 in a manner that exerts a vibrational force on effector 380 with a specific frequency and amplitude. Such a vibrational force may cause effector 380 to repeatedly strike opposite sides of the inner surface of effector enclosure 390 with a substantially similar force, thereby exerting a vibrational force on effector enclosure 390. Exerting a vibrational force on effector enclosure 390 causes effector enclosure 390 to vibrate, which exerts a vibrational force on the user's skull. The frequency and amplitude with which the skull vibrates is determined by the frequency and amplitude of the vibration of effector 380. Haptic actuation application 232 controls the frequency and amplitude at which effector 380 vibrates by configuring haptic output devices 150 to generate haptic output 155 that modifies the positions of haptic output extrema in haptic trap 370 with a particular frequency and amplitude.

As stated above, haptic actuation application 232 analyzes audio content generated by audio content generators 160 to determine the frequency and amplitude at which effector 380 should vibrate. Further, the user's skull vibrates with a frequency and amplitude that is substantially similar to the frequency and amplitude determined by haptic actuation application 232, which may transmit audio content to the user by causing a cochlea of the user to vibrate at the specified frequency and amplitude.

Figure 4:
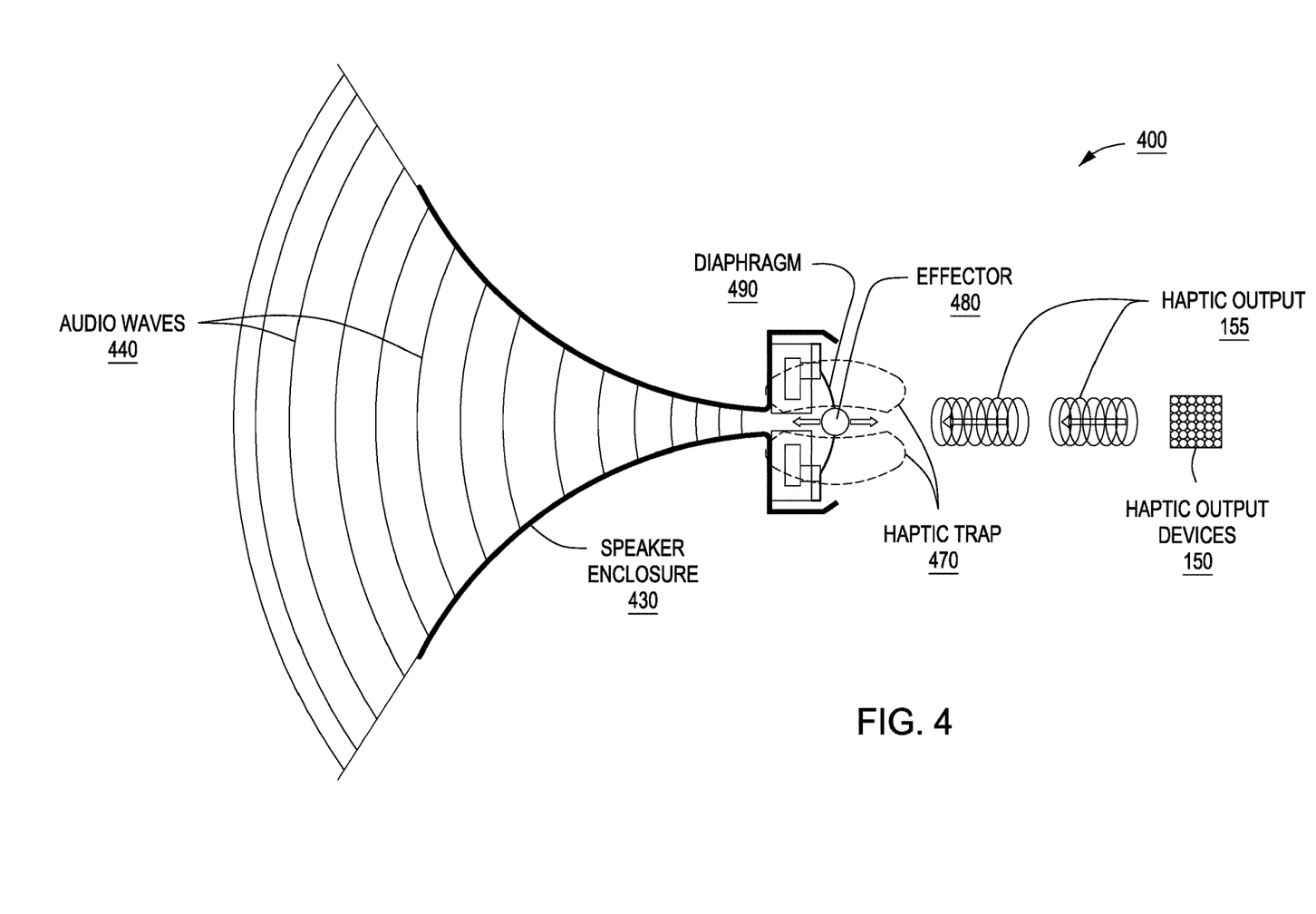
FIG. 4 illustrates a system for transmitting audio content to a user by vibrating a diaphragm, according to various embodiments.

FIG. 4 illustrates a system 400 for transmitting audio content to a user by vibrating diaphragm 490, according to various embodiments. As shown, system 400 includes haptic output devices 150 that generate haptic output 155. Haptic output 155 generates haptic trap 470 proximate to effector 480. Effector 480 is in physical contact with diaphragm 490. Haptic actuation application 232 configures haptic output devices 150 to modify haptic output 150 in order to shift the positions of haptic output extrema in haptic trap 470.

Haptic actuation application 232 further determines a frequency and an amplitude at which the one or more parameters of the haptic output extrema should be modified (e.g., the position), thereby exerting a vibrational force on effector 480. Exerting a vibrational force on effector 480 causes effector 480 to vibrate at the specified frequency and amplitude, thereby vibrating diaphragm 490 at the specified frequency and amplitude. Vibrating diaphragm 490 generates audio waves in speaker enclosure 430 at a substantially similar frequency and amplitude to the frequency and amplitude at which effector 480 vibrates. Thus, speaker system 400 receives audio content from audio content generators 160 and generates audio waves 440 that match the frequency and amplitude of the received audio content.

In various embodiments, effector 480 may be embedded in diaphragm 490 or may be attached to effector 480. In addition, effector 480 may be located in an effector enclosure. The effector enclosure may be placed in contact with diaphragm 490 in order to initiate production of audio waves 440. When the effector enclosure is removed from diaphragm 490, audio waves 440 may be no longer produced by speaker system 400.

Figure 5:
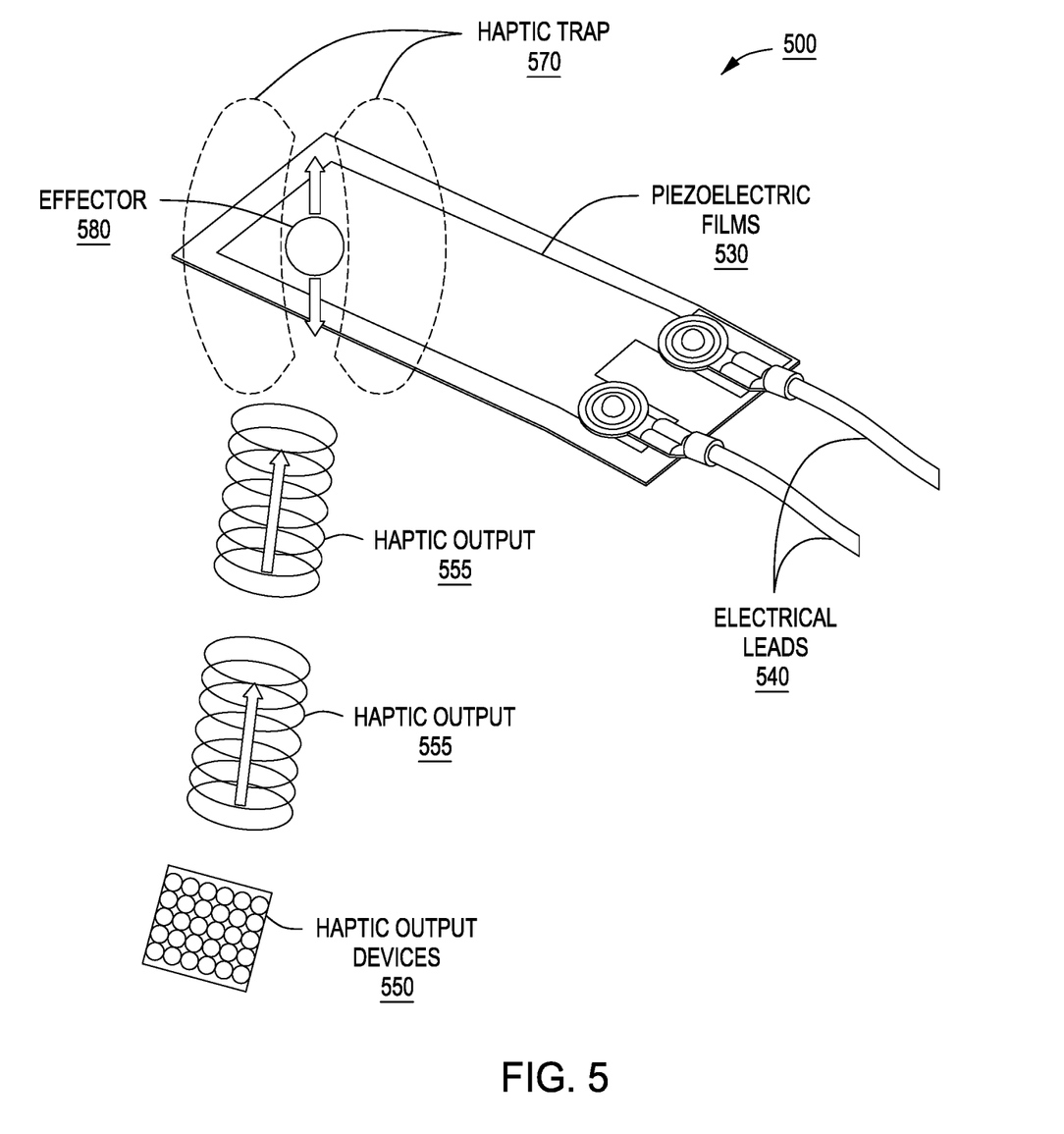
FIG. 5 illustrates a system for generating electricity on a piezoelectric film via haptic output, according to various embodiments.

FIG. 5 illustrates a system 500 for generating electricity on piezoelectric film 530 via haptic output 155, according to various embodiments. As shown, piezoelectric system 500 includes haptic output devices 150 that generate haptic output 155. Haptic output 155 generates haptic trap 570 proximate to effector 580. Effector 580 is in physical contact with piezoelectric film 530. Haptic actuation application 232 configures haptic output devices 150 to generate haptic output 155 that generates haptic trap 570 proximate to effector 580. Haptic actuation application 232 analyzes audio content from audio content generators 160 in order to determine a frequency and amplitude at which to vibrate piezoelectric film 530. Haptic actuation application 232 configures haptic output devices 150 to modify haptic output 155 in order to generate a vibrational force on effector 580 via haptic trap 570 at the determined frequency and amplitude. Effector 580 exerts a vibrational force on piezoelectric film 530 that causes piezoelectric film 530 to vibrate at the determined frequency and amplitude.

In various embodiments, when a strain is applied to piezoelectric film 530, a voltage difference is generated across electrical leads 540. When effector 580 moves, effector 580 exerts a force on piezoelectric film 530 that causes piezoelectric film 530 to deform, thereby applying a strain on piezoelectric film 530. The strain causes a voltage difference to be generated across electrical leads 540 proportional to the amplitude of the deformation. In addition, when effector 580 applies a vibrational force to piezoelectric film 530, piezoelectric film 530 vibrates with a frequency that is substantially similar to the frequency at which effector 580 vibrates. The vibration generates a voltage difference across electrical leads 540 that is proportional to the frequency and the amplitude of the vibration of piezoelectric film 530. Thus, in various embodiments, the voltage difference generated across electrical leads 540 is proportional to the frequency and amplitude of the audio content generated by audio content generators 160.

In one embodiment, electric leads 540 of piezoelectric film 530 are connected to an external speaker. Haptic actuation application 232 receives audio content from audio content generators 160 and analyzes the audio content to determine a frequency and amplitude. Haptic actuation application 232 configures haptic output devices 150 to generate haptic output 155 that exerts a vibrational force on effector 580, causing effector 580 to vibrate at the specified frequency and amplitude. When effector 580 vibrates, effector 580 exerts a vibrational force on piezoelectric film 530. When effector 580 exerts a vibrational force on piezoelectric film 530, piezoelectric film 530 vibrates at the specified frequency and amplitude, generating a voltage difference across electrical leads 540 proportional to the frequency and amplitude of the vibration of piezoelectric film 530. A processor within the external speaker analyzes the voltage difference to determine a frequency and amplitude at which to generate audio waves. The frequency and amplitude determined by the processer is substantially similar to the frequency and amplitude of the audio content generated by audio content generators 160. The processor configures the external speaker to generate audio waves at the determined frequency and amplitude, thereby reproducing the audio content of audio content generators 160 through the external speaker.

Figure 6:
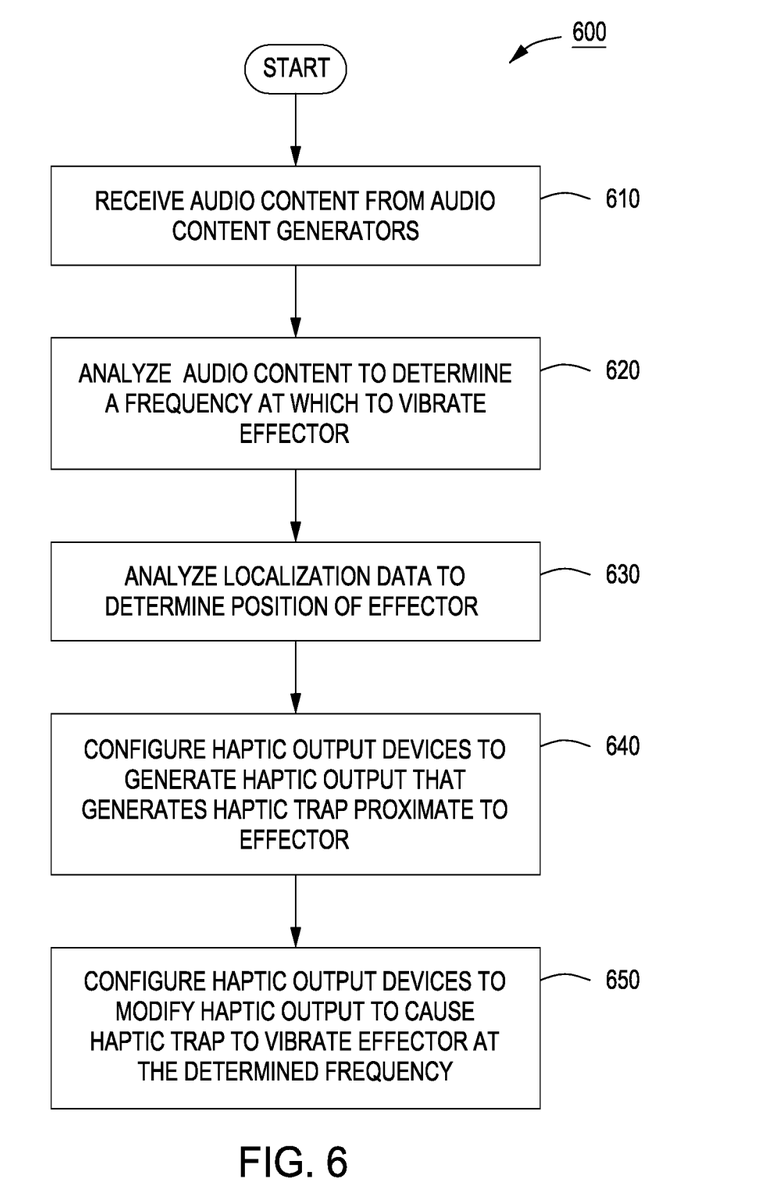
FIG. 6 illustrates a flow diagram of method steps for delivering audio content to a user via haptic output, according to various embodiments.

FIG. 6 illustrates a flow diagram of method steps for delivering audio content to a user via haptic output, according to various embodiments. Although the method steps are described in conjunction with the system of FIGS. 1-5, persons skilled in the art will understand that any system configured to perform the method steps, in any order, falls within the scope of the present disclosure.

As shown in FIG. 6, a method 600 begins at step 610, where haptic actuation application 232 receives audio content from audio content generators 160. Audio content generators 160 may include microphone systems, in-vehicle infotainment systems, audio stored in database 234, and so forth. At step 620, haptic actuation application 232 analyzes the audio content in order to determine a frequency at which to oscillate effector 180. Haptic actuation application 232 may access user preferences data in database 234 to determine whether the frequency and amplitude ranges of the audio content lie within the allowable frequency and amplitude ranges stored in database 234. If not, then haptic actuation application 232 may increase or decrease the average frequency and/or amplitude of the audio content to bring the audio content within the allowable frequency and amplitude range.

At step 630, haptic actuation application 232 analyzes sensor data to determine a position of effector 180. In various embodiments, effector 180 is located proximate to a user's head. Sensors 140 may be collocated with effector 180, may be included in an external sensing environment located proximate to a user, and/or may be included in a mobile or wearable device. In addition, effector 180 may include various localization elements, such as Bluetooth® low energy transmitters to facilitate haptic actuation application 232 in locating effector 180.

At step 640, haptic actuation application 232 configures haptic output devices 150 to generate haptic output 155 that generates haptic trap 170 proximate to effector 180. Haptic trap 170 includes haptic output extrema that are spatially arranged so that effector 180 is located in a haptic output minimum and one or more haptic output maxima are located at various sides of and distances away from the haptic output minimum.

At step 650, haptic actuation application 232 configures haptic output devices 150 to modify haptic output 155 to cause haptic trap 170 to vibrate effector 180 at the determined frequency. For example, haptic actuation application 232 may configure haptic output devices 150 to generate haptic output 155 that displaces the position of one or more haptic output extrema upwards, thereby deforming the shape of haptic trap 170. In particular, haptic actuation application 232 may configure haptic output devices 150 to modify haptic output 155 in order to repeatedly shift the position of one or more haptic output extrema between a first position and a second location in haptic trap 170. When effector 180 is located in such a haptic output extremum, haptic trap 170 exerts a vibrational force on effector 180 that causes effector 180 to vibrate at the frequency and amplitude at which the haptic extremum shifts between the first position and the second position. When effector 180 is located proximate to a user's head, effector 180 exerts vibrational forces on a user's skull that may cause a cochlea to vibrate at the specified frequency and amplitude, which may transmit the audio content generated by audio content generators 160 to the user.

In sum, the haptic actuation application receives audio content from an audio content generator. The haptic actuation application analyzes the audio content to determine a frequency and amplitude at which to vibrate the effector. In addition, the haptic actuation application receives localization data from one or more sensors that indicates the position of the effector. The haptic actuation application configures haptic output devices to generate haptic output that produces a haptic trap proximate to the effector. The haptic trap includes haptic output extrema disposed within the haptic trap, such that the effector is located at a haptic output minimum. The haptic actuation application configures the haptic output devices to modify the haptic output generated in order to repeatedly shift the position of the haptic output minimum between a first and second position at the determined frequency. Repeatedly shifting the position of the haptic output minimum exerts a vibrational force on the effector that causes the effector to vibrate at the determined frequency and amplitude. When the effector is located proximate to a user's head, the effector vibrates a user's skull at the determined frequency and amplitude. The user's skull may vibrate a user's cochlea, which may transmit the audio content to the user.

At least one advantage of the techniques described herein is that audio content can be transmitted to a user by a mid-air haptic system. Using haptic output devices to transmit audio content to a user via bone conduction enables private delivery of audio content to a user, without reducing the user's ability to hear sounds in the external environment. Accordingly, the techniques described herein can be implemented to design mid-air haptic systems for audio content delivery in environments that place a high auditory demand on users, such as public transportation hubs.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable processors or gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A system for delivering audio content, the system comprising:
    a memory storing instructions; and
    a processor configured to execute the instructions to:
        analyze the audio content to determine a frequency at which to vibrate an effector;
        configure one or more haptic output devices to generate haptic output that generates a haptic trap proximate to the effector; and
        configure the one or more haptic output devices to modify the haptic output to cause the haptic trap to vibrate the effector at the determined frequency,
        wherein the effector is configured to vibrate to transmit the audio content.

2. The system of claim 1, wherein the processor is further configured to execute the instructions to receive localization data from one or more sensors, wherein the localization data indicates a position of the effector.

3. The system of claim 1, wherein the processor is further configured to execute the instructions to analyze the audio content to determine the frequency at which to vibrate the effector by:
    analyzing the audio content to determine a frequency pattern;
    analyzing the audio content to determine an amplitude pattern; and
    determining the frequency at which to vibrate the effector based on the frequency pattern and the amplitude pattern.

4. The system of claim 1, wherein the haptic trap includes a haptic output maximum and a haptic output minimum.

5. The system of claim 4, wherein the processor is further configured to execute the instructions to configure the one or more haptic output devices to generate haptic output by configuring the one or more haptic output devices to generate haptic output that generates the haptic trap, wherein the haptic output minimum is located at a first position that is collocated with a position of the effector.

6. The system of claim 5, wherein the processor is further configured to execute the instructions to configure the haptic output devices to modify the haptic trap by configuring the haptic output devices to generate second haptic output, wherein the haptic output minimum shifts from the first position to a second position based on the second haptic output.

7. The system of claim 6, wherein the second position is determined by an amplitude associated with the audio content.

8. The system of claim 6, wherein the processor is further configured to configure the haptic output devices to generate repeated haptic output that shifts the haptic output minimum between the first position and the second position with a frequency associated with the audio content.

9. The system of claim 8, wherein the repeated haptic output:
    varies a location of the second position based on an amplitude associated with the audio content; and
    varies the frequency at which the haptic output minimum repeatedly shifts between the first position and the second position based on a frequency associated with the audio content.

10. The system of claim 8, wherein the repeated haptic output causes the effector to transmit the audio content via one of passive mechanical waves, audio wave transmission, or voltage differences.

11. The system of claim 1, wherein the effector vibrates one of a diaphragm or a piezoelectric film.

12. The system of claim 1, wherein the one or more haptic output devices comprise ultrasonic transducer devices.

13. A system for delivering audio content, the system comprising:
  one or more haptic output devices configured to:
    generate haptic output that generates a haptic trap proximate to an effector; and
    modify the haptic output to cause the haptic trap to vibrate the effector, wherein the effector is configured to vibrate to transmit the audio content.

14. The system of claim 13, wherein the haptic trap vibrates the effector at a frequency associated with the audio content.

15. The system of claim 13, wherein the haptic trap includes a haptic output maximum and a haptic output minimum.

16. The system of claim 15, wherein the one or more haptic output devices are configured to:
  generate haptic output that generates the haptic trap, wherein the haptic output minimum is located at a first position that is collocated with a position of the effector;
  generate second haptic output, wherein the haptic output minimum shifts from the first position to a second position based on the second haptic output; and
  generate repeated haptic output that shifts the haptic output minimum between the first position and the second position with a frequency associated with the audio content.

17. The system of claim 13, wherein the haptic trap vibrates the effector at a frequency that is higher than a frequency associated with the audio content.

18. The system of claim 13, wherein the haptic trap causes an effector enclosure that includes the effector to vibrate, and the effector enclosure causes the effector to vibrate.

19. The system of claim 13, wherein the one or more haptic output devices comprise ultrasonic transducer devices.

20. A method for delivering audio content to a user, the method comprising:
  analyze the audio content to determine a frequency at which to vibrate an effector;
  configure one or more haptic output devices to generate haptic output that generates a haptic trap proximate to the effector; and
  configure the one or more haptic output devices to modify the haptic output to cause the haptic trap to vibrate the effector at the determined frequency, wherein the effector vibrates to transmit the audio content to the user.

* * * * *